United States Patent Office 3,011,443
Patented Dec. 5, 1961

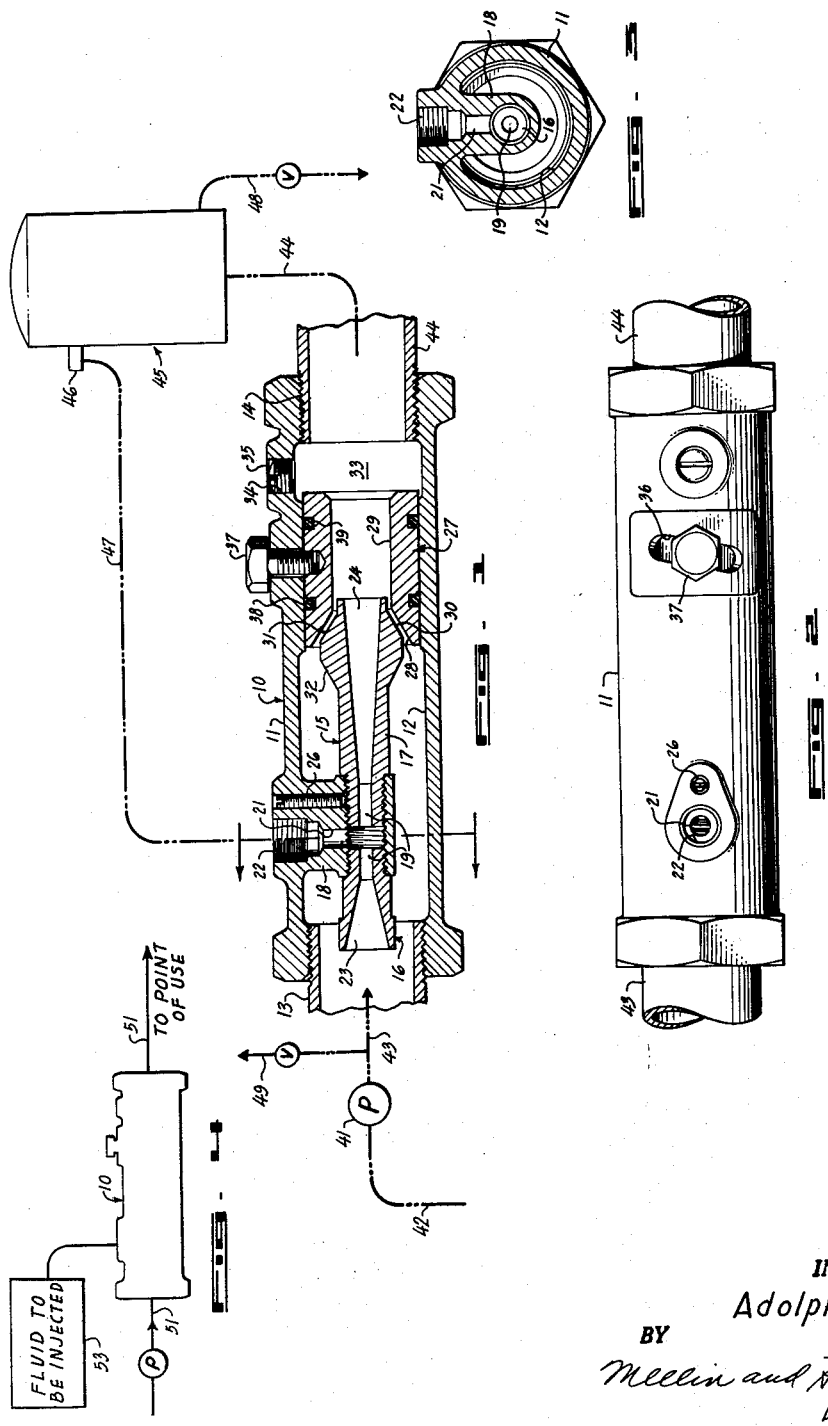

3,011,443
ADJUSTABLE FLUID INJECTOR
Adolph Nielsen, Oakland, Calif., assignor to Nielsen Mfg. Co., Oakland, Calif., a corporation of California
Filed Jan. 12, 1960, Ser. No. 1,964
3 Claims. (Cl. 103—6)

My invention relates to fluid injectors, and more particularly to injectors employing a venturi action to introduce one fluid into a second fluid by means of the energy of the second fluid.

This application is a continuation-in-part of my prior copending application, Serial No. 669,674, filed July 2, 1957, and entitled "Air Charger." This prior application has been issued as United States Patent No. 2,938,464.

One particular use of the presently disclosed injector is in a pump and storage tank water pressure system, wherein water pressure is normally maintained by a compressed air cushion in the closed storage tank. In a conventional system of this type, the water within such a tank gradually absorbs air from the air cushion, and the amount of water which can be removed from a given size tank at a given pressure range is thus greatly reduced. This loss of air cushion is commonly referred to as "water logging" of the tank. To relieve this condition, air injecting devices are employed to replenish the air within the tank by injecting air into the water as it is pumped to the tank. Such air injectors normally employ a venturi tube and operate in such manner that a portion of the water passing through the injector will be forced through the venturi tube to draw in air. To be effective, the venturi passage must be quite small in cross section at its throat, and, consequently, the venturi passage must be bypassed by most of the water passing through the injector if the tank is to be filled in a practicable length of time. However, if the venturi passage is bypassed, then little water is forced through the venturi, and, consequently, little air is drawn into the water. Prior efforts to overcome this problem have resulted in air injectors having the bypass flow restricted by spring biased valve members so that all of the water is initially forced through the venturi until the pressure of the incoming water exceeds the biasing of the bypass valve member, the flow then occurring both through the venturi and the bypass valve. If it is desired to backflow the tank, i.e., to draw the service water from the tank back through the air charger to point of use, then another valve must be provided to allow such water to bypass the venturi passage in the other direction.

By means of the present invention, an air injector has been devised which will allow a large volume of water to flow therethrough at all times, and in either direction, while yet providing for sufficient water to be forced through the venturi passage to draw air into the water passing through the injector. Applicant has accomplished this by using the major portion of the water flowing through to the injector to create a suction to induce a flow of water through the conventional venturi tube so that the air injector has a double venturi action to draw the air into the water. By the present invention, all springs, valves and other moving parts are eliminated, without the elimination of their functions.

It is an object of this invention to provide an injector adapted to draw air into the fluid passing through the injector by a double, or compound, venturi action.

It is a further object of this invention to provide a housing having a first venturi flow passage therein, a second venturi passage coaxial therewith and having its discharge within the throat of the first venturi, and an injector passage through the housing into the throat of the second venturi.

A further important object of the invention is to provide an injector as above described in which the flow of the main fluid through the injector can be adjusted so as to vary the pressure drop across the venturi. Such adjustment thus enables the injector to be set to produce a desired amount of injection of a secondary fluid into the main fluid. Another important feature is that the adjustment may be made when the injector is connected into a flow line and the main fluid is flowing therethrough.

Yet another object is to provide a pump pressure system utilizing the above described injector.

Other objects and advantages will become apparent in the course of the following detailed description.

In the drawings, forming a part of this application, and in which like parts are designated by like reference numerals throughout the same, FIG. 1 is a sectional view of an injector constructed in accordance with the invention, with parts shown in elevation, and a pump pressure system shown schematically in which the air charger may be used.

FIG. 2 is a plan view of the injector shown in FIG. 1.

FIG. 3 is a sectional view of the injector taken on line 3—3 of FIG. 1.

FIG. 4 is a schematic illustration of another system in which the injector of FIG. 1 may be used.

Referring now to the drawings, wherein is shown a preferred embodiment of the invention, the injector 10 comprises a tubular housing member 11 having a main flow passage 12 therethrough. The intake and discharge ends of the flow passage are threaded at 13 and 14, respectively, for connection into a pipe line. A venturi passage 15 is formed coaxially to the flow passage 12 by tubular venturi members 16 and 17 mounted in an end-to-end relation in an internal boss 18 formed integrally with the housing member 11. The venturi passage has a restricted throat portion 19 within boss 18 which is in communication with an injection passage 21 formed through the boss to a threaded inlet 22. The venturi members are flared outwardly from the restricted throat 19 to form a venturi intake 23 and a venturi discharge 24, respectively. A set screw 26 is employed to retain the venturi member 17 in fixed threaded engagement with boss 18.

An annular sleeve 27 is disposed within the flow passage 14 adjacent the discharge end 24 of the venturi member 17 and has an upstream surface 28 which tapers inwardly to a restricted diameter throat portion 29. The discharge end 24 of venturi member 17 is radially enlarged to provide a tapered surface 30 thereon cooperating with sleeve surface 28 to form an annular passage 31 therebetween which converges inwardly toward the discharge end of the venturi member 17. The radially enlarged portion of venturi member 17 tapers back to the body thereof at 32 so as to reduce the turbulence of the fluid flowing through the annular space between the venturi members and the housing member.

The restricted throat 29 of sleeve 27 discharges into the outlet chamber 33 in the discharge end of the housing member. A radial port 34, shown as closed by plug 35, is provided in the outlet chamber to enable a pressure gauge to be connected thereto, if desired.

The housing member 11 has a helical slot 36 formed therethrough laterally into the flow passage 14 adjacent sleeve 27. An adjustment screw 37 extends from exteriorly of the housing member through slot 36 into sleeve 27. As is apparent, helical movement of screw 37 lengthwise in slot 36 causes longitudinal movement of sleeve 27 within flow passage 12, which in turn changes the cross-sectional area of the annular passage 31 formed by and between the sleeve 27 and venturi member 17 and varies the flow capacity of the injector. When the size of this passage has been adjusted as desired, screw 37 is tightened into the sleeve to lock against housing 11. O-rings 38 and 39 seal between sleeve 27 and housing 11 at the intake and discharge sides of slot 36 to prevent fluid from escaping through slot 36.

The venturi member 17 is formed so that the discharge end 24 thereof is disposed within the restricted throat 29 of sleeve 27 at all times, regardless of the longitudinal adjustment of the sleeve within flow passage 12, so that no undesired back pressure is built up at the discharge end of venturi 15.

One system in which the injector 10 is particularly useful is the pump pressure system shown in FIG. 1, wherein pump 41, having an inlet 42 disposed in a well, pumps water under pressure through pipe line 43 into the intake of the injector. The discharge of the injector is connected by pipe line 44 to a closed storage tank 45. An air control valve 46 admits air into line 47 which is connected to the threaded injection passage 21 of the injector. The air control valve 46 selectively admits air from the tank or atmosphere in accordance with the height of the water within the tank, as is well known in the art.

As water is pumped through the injector, the greatest flow will take place in the annular space between the venturi members 16 and 17 and the housing member 11, as the cross-sectional area of the annular passage 31 is considerably greater than that of the throat of the venturi 19. In then passing through the annular passage 31, the velocity of the water increases greatly and the stream converges upon itself as it passes into the throat 29 of sleeve 27.

This high velocity converging water stream creates a region of low pressure at the discharge end of venturi 15 so that there is an appreciable pressure drop between the intake and discharge ends of the venturi. This pressure drop increases the flow of water through the venturi 15, and correspondingly increases the amount of air drawn through the injection passage 21 and injected into the water passing through the venturi.

Thus, the present air charger has a double venturi effect with the main water flow through the annular passage 31 serving to boost the water flow through the small venturi passage 15 and to create a very high velocity of water in the restricted venturi throat 19. This booster effect eliminates the necessity for initially forcing all of the water through the venturi passage, and thus eliminates the necessity for providing bypass valves around the injector.

As will be noted, the cross-sectional flow area is the same for both directions of flow through the injector. Thus, the injector may be used in a "through tank" system, wherein all water used in the system passes through the injector and is drawn off through the valved discharge line 48, or it may be used in a "floating tank" system, wherein water stored in tank 45 backflows through injector 10 to be distributed by the valved line 49 to point of use. Both systems are in common use, and the disclosed injector may be successfully used with both.

The disclosed injector has a significant advantage in that the cross-sectional area of the annular passage 31 may be adjusted to the particular components of a pump pressure system to provide the maximum efficiency in the system. For any given system, a lesser amount of energy will be required at the pump to fill the tank if the cross-sectional area of the annular passage 31 is increased, since the fluid resistance pressure drop of the injector will decrease. At the same time, however, an increase in the cross-sectional area of annular passage 31 will decrease the air injecting ability of the device. For a given pump pressure system, then, there will be an optimum setting of the sleeve 27 relative to tubular member 17 which will provide the necessary amount of air injection with a minimum restriction to water flow through the injector.

The particular design of the injector makes the proper setting an easy task, since the sleeve 27 can be adjusted from the outside of the injector after the injector has been permanently connected into the flow line. To adjust, a pressure gauge (not illustrated) may be screwed into the threaded fitting 22 of the injection passage 21, and the pump 41 is run at normal speed. The sleeve 27 is then adjusted by moving the screw 37 lengthwise of the helical slot 36 until the desired sub-atmospheric pressure is indicated by the pressure gauge. The screw 37 is then tightened to lock sleeve 27 against further movement, the pressure gauge is removed and the air line 47 is connected to the injection passage 21.

Once the setting of the sleeve 27 has been made, there are no moving parts to get out of order during the operation of the parts, thus making the device extremely dependable in use. The high velocity of the water through the restricted venturi throat produces a higher degree of air injection per volume of water passing through the injector than heretofore possible, and eliminates the need for separate air compressors often needed on relatively large installations.

In addition, the injector 10 may be used in other fluid injecting systems, such as generally illustrated in FIG. 4, wherein it is desired to inject one fluid into another. In FIG. 4, the injector 10 is connected into a main flow line 51, in which a primary fluid flows under pressure. A pump 52 is indicated as the pressure source, although gravity could supply the necessary head of pressure in many systems. The injection passage 21 is connected to a reservoir 53 of the secondary fluid to be injected into the primary fluid.

This system can be used to introduce carbon dioxide gas into water lines on water towers to eliminate algae conditions. Similarly, chlorine can be added in water treatment lines. This system can be used to inject non-toxic chemical for cleaning purposes in dairy lines. Other such uses will be apparent.

The methods of chemical introduction used at the present time inject the chemical into the carrier fluid at the suction end of a pump, or else use a special chemical feed pump. The present injector dispenses with these expensive devices by enabling the chemicals to be introduced with a primary fluid which is already under pressure, thus eliminating chemical feed pumps which must have a higher pressure than the main flow line and enabling fluids to be injected into pressure lines which do not have a pump with a suction end available for such injection.

In addition, the described injector affords an easy and convenient manner in which the degree of injection can be varied as desired by the external adjustment of the annular passage 31.

It is to be understood that the form of the invention herewith shown and described is to be taken as a preferred embodiment of the same, and that various changes in the shape, size and arrangement of parts may be resorted to without departing from the spirit of this invention or the scope of the attached claims.

What is claimed is:

1. A fluid system comprising pump means for pumping water, a closed water storage tank, a pipe line connecting said pump means to said tank, an injector connected in said pipe line and having an intake directed towards said pump means and a discharge directed towards said tank, said injector comprising a housing member provided with a flow passage therethrough, a tubular member mounted in said flow passage and forming an annular flow space between said tubing member and said housing member, said tubular member having a venturi passage therethrough coaxial to said flow passage, means forming an injection passage through said housing member and into the throat of said venturi passage, an annular member disposed in said flow passage adjacent the discharge end of said venturi passage, said annular member and said tubular member having surfaces thereon forming an annular passage therebetween which converges inwardly toward the discharge end of flow passage, said housing member having a helical slot formed therethrough laterally into said flow passage, a lockable adjustment member extending from the exterior of said housing member through said slot into said annular member, and means sealing between said annular member and said housing member on the intake and discharge sides of said slot.

2. An injector comprising a housing member provided with a flow passage therethrough having intake and discharge ends, a tubular member mounted in said flow passage and forming an annular flow space between said tubing member and said housing member, said tubular member having a venturi passage therethrough coaxial to said flow passage, means forming an injection passage through said housing member and into the throat of said venturi passage, an annular member disposed in said flow passage adjacent the discharge end of said venturi passage, said annular member and said tubular member having surfaces thereon forming an annular passage therebetween which converges inwardly toward the discharge end of flow passage, said housing member having a helical slot formed therethrough laterally into said flow passage, and an adjustment member extending from the exterior of said housing member through said slot into said annular member.

3. An injector comprising a housing member provided with a flow passage therethrough having intake and discharge ends, means on said housing for connecting said intake and discharge ends into a fluid flow line, a tubular member mounted in said flow passage and forming an annular flow space between said tubular member and said housing member, said tubular member having a venturi passage therethrough coaxial to said flow passage, means forming an injection passage through said housing member and into the throat of said venturi passage, an annular member disposed in said flow passage adjacent the discharge end of said venturi passage, said annular member and said tubular member having surfaces thereon forming an annular passage therebetween which converges inwardly toward the discharge end of flow passage, said housing member having a helical slot formed therethrough laterally into said flow passage, a lockable adjustment member extending from the exterior of said housing member through said slot into said annular member, and means sealing between said annular member and said housing member on the intake and discharge ends of said slot.

References Cited in the file of this patent

UNITED STATES PATENTS

| | | |
|---|---|---|
| 54,615 | Shapley | May 8, 1866 |
| 220,471 | Fulton | Oct. 14, 1879 |
| 2,938,464 | Nielsen | May 31, 1960 |